US009144004B2

(12) United States Patent
Ebara et al.

(10) Patent No.: US 9,144,004 B2
(45) Date of Patent: Sep. 22, 2015

(54) MOBILE STATION AND METHOD FOR MOBILE COMMUNICATION SYSTEM

(75) Inventors: Hidetoshi Ebara, Chiyoda-ku (JP); Masato Maeda, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 183 days.

(21) Appl. No.: 13/639,046

(22) PCT Filed: Mar. 30, 2011

(86) PCT No.: PCT/JP2011/058090
§ 371 (c)(1),
(2), (4) Date: Oct. 2, 2012

(87) PCT Pub. No.: WO2011/125776
PCT Pub. Date: Oct. 13, 2011

(65) Prior Publication Data
US 2013/0023271 A1    Jan. 24, 2013

(30) Foreign Application Priority Data

Apr. 2, 2010  (JP) ................................. 2010-085957

(51) Int. Cl.
*H04W 36/36* (2009.01)
*H04W 36/32* (2009.01)
(Continued)

(52) U.S. Cl.
CPC .............. *H04W 36/36* (2013.01); *H04W 36/32* (2013.01); *H04W 24/10* (2013.01); *H04W 36/30* (2013.01)

(58) Field of Classification Search
CPC ..... H04W 36/00; H04W 36/30; H04W 36/32; H04W 36/14; H04W 36/38; H04W 36/0083; H04W 88/02; H04W 72/12; H04W 84/105; H04W 24/10

USPC .................................. 455/436; 370/328, 331
See application file for complete search history.

(56) References Cited

U.S. PATENT DOCUMENTS 6,073,021 A *   6/2000   Kumar et al. ................. 455/442
2003/0119508 A1*  6/2003   Gwon et al. .................. 455/436
(Continued)

FOREIGN PATENT DOCUMENTS

CN       1832622 A     9/2006
CN     101026860 A     8/2007
(Continued)

OTHER PUBLICATIONS

3GPP TS 25.331 V6.24.0, "$3^{rd}$ Generatrion Partnership Project; Technical Specification Group Radio Access Network; Radio Resource Control (RRC); Protocol Specification," Total 1254 Pages, (Dec. 2009).

(Continued)

*Primary Examiner* — Nizar Sivji
(74) *Attorney, Agent, or Firm* — Oblon, McClelland, Maier & Neustadt, L.L.P.

(57) ABSTRACT

A mobile station includes a measurement unit that measures radio qualities for a serving cell and a candidate switching target cell; a cell switching determination unit that determines whether the radio quality of the serving cell is less than a reference quality corresponded in advance with a predetermined throughput, wherein, when the radio quality of the serving cell is less than the reference quality, the cell switching determination unit determines whether the serving cell is to be switched to the candidate switching target cell by comparing the radio quality of the serving cell with that of the candidate switching target cell; and a radio communication unit that transmits a signal for requesting the switching of the serving cell, and that receives a signal for instructing the switching of the serving cell from a network apparatus.

5 Claims, 6 Drawing Sheets

(51) Int. Cl.
   *H04W 24/10* (2009.01)
   *H04W 36/30* (2009.01)

(56) References Cited

U.S. PATENT DOCUMENTS

| | | | |
|---|---|---|---|
| 2010/0135208 A1 | 6/2010 | Ishii et al. | |
| 2010/0208707 A1* | 8/2010 | Hamabe et al. | 370/332 |
| 2010/0330994 A1* | 12/2010 | Matsuo et al. | 455/436 |

FOREIGN PATENT DOCUMENTS

| | | |
|---|---|---|
| CN | 101300863 A | 11/2008 |
| JP | 2007 134993 | 5/2007 |
| JP | 2008 172373 | 7/2008 |
| JP | 2008 288627 | 11/2008 |
| JP | 2010-28269 A | 2/2010 |
| WO | WO 2008/037552 A1 | 4/2008 |
| WO | 2008 136294 | 11/2008 |
| WO | WO 2008/157573 A1 | 12/2008 |

OTHER PUBLICATIONS

3GPP TS 25.214 V6.11.0, "$3^{rd}$ Generation Partnership Project; Technical Specification Group Radio Access Network; Physical layer procedures (FDD)," Total 60 Pages, (Dec. 2006).

International Search Report Issued May 17, 2011 in PCT/JP11/58090 Filed Mar. 30, 2011.

Japanese Office Action issued Oct. 2, 2012 in Patent Application No. 2010-085957 with English Translation.

The Extended European Search Report issued Mar. 5, 2014, in Application No. / Patent No. 11765676.9-1854 / 2555561 PCT/JP2011058090.

Chinese Office Action issued Oct. 17, 2014, in China Patent Application No. 201180021991.6 (with English translation).

Chinese Office Action mailed on Mar. 9, 2015 in corresponding Chinese patent application No. 201180021991.6 with English translation, citing document AO therein.

* cited by examiner

FIG.2

| MEASURED $E_c/N_0$ [dB] | ESTIMATED SIR [dB] |
|---|---|
| −5.0 | 10.0 |
| −7.5 | 5.0 |
| −10.0 | 0 |
| −12.5 | −2.5 |
| −15.0 | −5.0 |

FIG.3

| SIR MEASURED VALUE [dB] | CQI DETERMINATION VALUE | ESTIMATED DOWNLINK DATA TRANSMISSION RATE [kbps] |
|---|---|---|
| 6 | 25 | 4000 |
| 3 | 20 | 3000 |
| 0 | 15 | 2000 |
| −3 | 10 | 1000 |
| −6 | 5 | 500 |

FIG.4

| CQI | WHETHER SWITCHING OF SERVING CELL IS POSSIBLE | EVENT 1d TTT [ms] |
|---|---|---|
| $25 \leq x$ | × | 5120ms |
| $20 \leq x < 25$ | × | 2560ms |
| $15 \leq x < 20$ | ○ | 1280ms |
| $10 \leq x < 15$ | ○ | 640ms |
| $x < 10$ | ○ | 320ms |

MOBILE STATION AND METHOD FOR MOBILE COMMUNICATION SYSTEM

TECHNICAL FIELD

The disclosed invention relates to a mobile station and a method for a mobile communication system.

BACKGROUND ART

During mobile communication, a mobile station performs communications with network apparatuses, the network apparatuses include a base station apparatus and a radio network controller. The network apparatuses may include a core network. The mobile station detects multiple cells that can be targets for communications or candidates for communications, and measures radio quality in the cells. When a measured value of the radio quality of a communication candidate cell satisfies a predetermined condition, a communication target cell is switched. For example, when it is determined that a newly detected cell will provide relatively better radio quality than that of a cell that has already been performing communications, the communication target cell is switched to the newly detected cell.

A high-speed downlink packet access (HSDPA) scheme realizes high-speed down link communication for the wideband code division multiple access (W-CDMA) communication scheme. In this case, an A-DPCH (Associated Dedicated Physical CHannel) simultaneously performs communications with up to three cells. However, an HS-PDSCH (High Speed-Physical Downlink Shared CHannel) sets only one cell that has the best radio quality as a communication target. The cell which has been selected as the cell having the best quality is called a "Serving Cell." Since the A-DPCH is the communication based on a dedicated channel, a soft handover is performed. While maintaining the communication with the serving cell, only the switching target cell is switched depending on necessity. On the other hand, since the HS-PDSCH is the communication based on a down link shared or common channel (Shared channel), there is only one cell that can be a communication target. Therefore, when a cell is switched due to, for example, movement of a user, a handover is performed, and thereby a short interruption occurs temporarily. A conventional handover is described in Patent Document 1, for example.

During communication based on the HSDPA scheme, the mobile station measures quality (such as SIR) of a CPICH, which is a pilot channel in the serving cell. The mobile station derives a channel quality indicator (CQI: Channel Quality Indicator) based on the measurement result. The derived CQI is reported from the mobile station to the network apparatus. As a result, the network apparatus can recognize a reception environment (radio quality) of the mobile station, and the mobile station can adaptively switch a modulation scheme and a transmission data amount for down link data, depending on the environment. It is called adaptive modulation and channel coding to adaptively switch the data modulation scheme and the amount of data (or the channel coding rate). Relationships of the down link data modulation scheme and a transport block size (Transport Block size) with respect to individual values of the CQI are defined in a 3GPP specification (cf. Non-Patent Document 2).

RELATED ART DOCUMENT

Patent Document

Patent Document 1: Japanese Patent Laid-Open Application No. 2008-172373

Non-Patent Document

Non-patent Document 1: 3GPP TS25.331 v6.24.0 (2009-12)
Non-patent Document 2: 3GPP TS25.214 v6.11.0 (2006-12)

SUMMARY OF THE INVENTION

Problem to be Solved by the Invention

In an area where relatively many users exist, such as an urban area or a busy district, an installed number of base station apparatuses is increased so as to distribute the communication capacity of the network apparatuses, and a communication area is constructed by using multiple cells. Therefore, in a case where communication is performed at a place where it is expected that there are many users, the mobile station often detects multiple cells. There are advantages and disadvantages for the existence of the multiple cells having fine radio quality to the extent that the mobile station can set the cells as the communication targets, when the mobile station performs communication with the network apparatus. When the user itself moves or a neighboring object varies, the radio environment varies due to fading, for example, and the communication tends to be interrupted. However, when there are many cells, each having relatively good quality, there is an advantage that it can be made easy to avoid interrupting the communication by suitably switching to them. However, when there are many communication candidate cells, a number of times to find cells which are better than the current one is increased. Therefore, the communication cell has to be frequently switched as changes occur in the relative radio quality.

When the switching of the communication target cell frequently occurs during the HSDPA communication, the switching of the HS-PDSCH from the serving cell is also frequently performed. As described above, between the mobile station and the network apparatus, the down link data is communicated by the HS-PDSCH of the shared channel. When the communication target cell is to be switched, the communication of the down link data is temporarily discontinued, and the process of switching the cell is performed. Therefore, if the switching of the HS-PDSCH frequently occurs, the frequency that the down link data is interrupted is also increased. Accordingly, it is possible that the communication speed of the down link data is lowered.

The problem of the disclosed invention is to suppress switching of a cell that is not required for maintaining communication.

Means for Solving the Problem

The mobile station according to one embodiment of the disclosed invention is a mobile station including a measurement unit that measures radio quality for a serving cell and for a candidate switching target cell; a cell switching determination unit that determines whether the radio quality of the serving cell is less than reference quality, the reference quality having been corresponded with a predetermined throughput in advance, wherein, when the radio quality of the serving cell is less than the reference quality, the cell switching determination unit determines whether the serving cell is to be switched to the candidate switching target cell by comparing the radio quality of the serving cell with the radio quality of the candidate switching target cell; and a radio communication unit that transmits a first signal for requesting the switching of the serving cell, and that receives a second signal for instructing the switching of the serving cell from a network apparatus.

Effect of the Present Invention

According to the disclosed invention, switching of the cell that is not required for maintaining the communication can be suppressed.

BRIEF DESCRIPTION OF THE DRAWINGS

FIG. 2 is a diagram showing a correspondence relationship between measured values of $Ec/N_0$ and estimated values of SIR;

FIG. 3 is a diagram showing a correspondence relationship among SIR, CQI, and a downlink data rate;

FIG. 4 is a diagram showing information stored in a various table storing unit when reference CQI is 20;

EMBODIMENTS FOR CARRYING OUT THE INVENTION

A mobile station according to one embodiment of the disclosed invention is a mobile station that obtains and stores CQIs for individual cells that have been detected and measured by the mobile station, among a serving cell, with which the mobile station is communicating, and cells other than the serving cell, and that determines whether switching of the serving cell is required by comparing an absolute value of the CQI of the serving cell and an absolute value of a reference CQI. When the mobile station is to switch the serving cell, for an arbitrary index (e.g., $Ec/N_0$, RSCP, path loss, SIR, and CQI) for comparison, the mobile station performs a two-step determination of the switching of the cell by performing a determination of the switching of the cell based on an absolute value comparison and a determination of the switching of the cell based on a relative value comparison.

For switching a communication target cell, which is communicating in a HSDPA scheme, conventionally, the determination of the switching of the cell has been made by relatively comparing radio quality of corresponding cells. Accordingly, when there are many cells where the radio quality is relatively good, the switching of the cell frequently occurs, and it is possible that a downlink data transmission rate is lowered. On the other hand, according to one embodiment of the disclosed invention, the switching of the serving cell is performed only if it has been confirmed that it is not possible to achieve an estimated data transmission rate and the detected cell satisfies a certain criteria. Therefore, unnecessary switching of the cell is suppressed and the data transmission rate is prevented from being lowered.

The mobile station may measure the data transmission rate during communication at every constant interval and may store the measured values. When the serving cell is to be switched, the mobile station may dynamically change the value of the reference CQI, based on the data transmission rates in the past. With this, the value of the reference CQI can be changed to a value that is suitable for a communication condition, and thereby optimization of the switching of the cell can further be facilitated.

Figure 1:
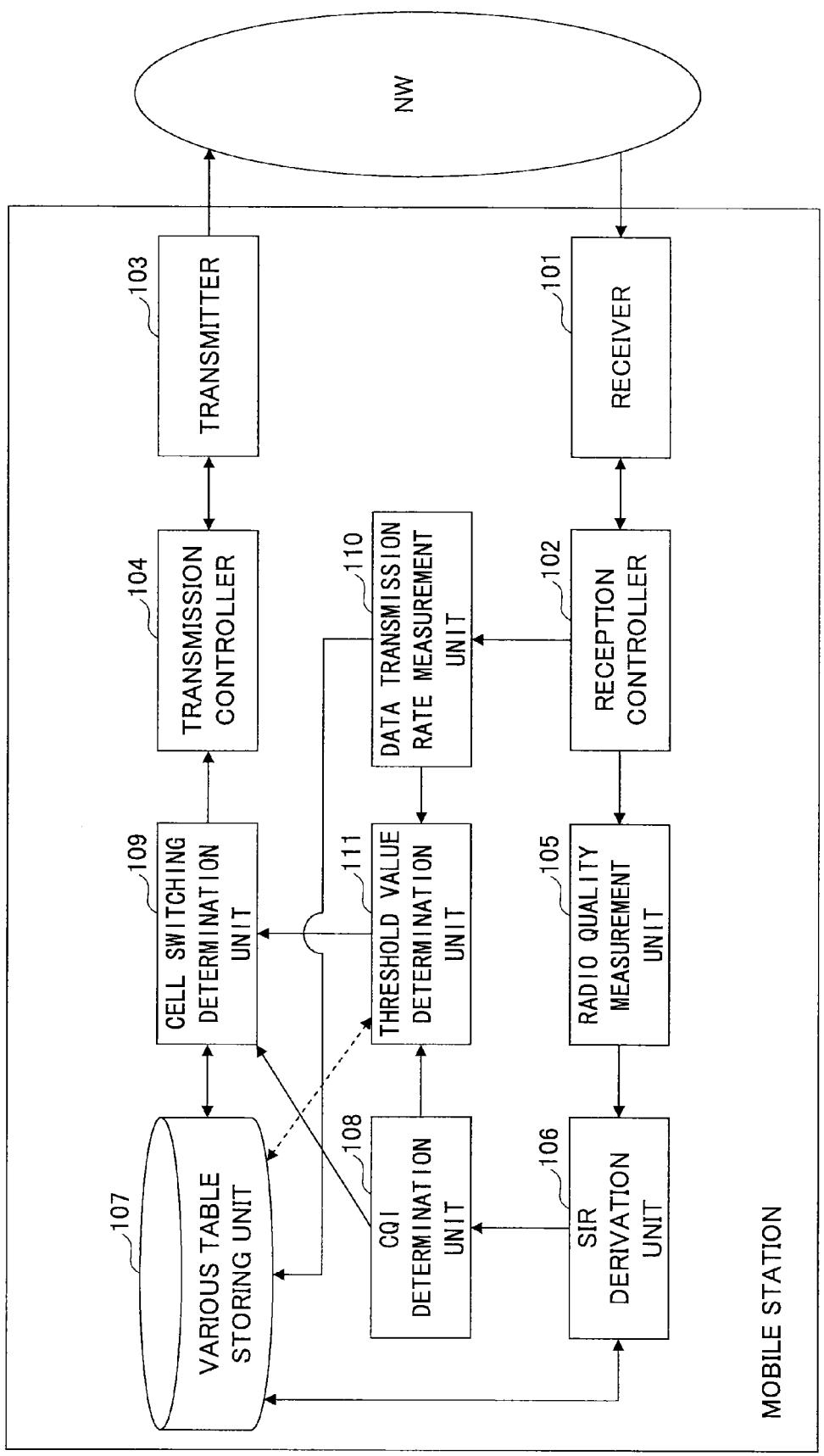
FIG. 1 is a diagram showing a mobile station according to one embodiment.

The embodiment will be explained from the following viewpoints.
1. Mobile station
2. Example of operations
3. Modified example
<First Embodiment>
<1. Mobile Station>
FIG. 1 shows a mobile station according to one embodiment. FIG. 1 shows a receiver 101; a reception controller 102; a transmitter 103; a transmission controller 104; a radio quality measurement unit 105; a SIR derivation unit 106; a various-table storing unit 107; a CQI determination unit 108; a cell switching determination unit 109; a data transmission rate measurement unit 110; and a threshold value determination unit 111. FIG. 1 merely shows schematically elements that are particularly related to the embodiment, among various functional elements included in the mobile station. Thus, the way of dividing the functional elements shown in the figure is for the sake of convenience. For example, two or more functional elements may be realized by a single means. These functional elements may be realized by hardware, software, or a combination thereof. The mobile station is user equipment such as a cellular phone, an information terminal, a personal digital assistant, and a mobile personal computer.

The receiver 101 receives signals transmitted from network apparatuses. The network apparatuses include, at least, a base station, and, depending on necessity, a radio network controller that controls the base station.

The reception controller 102 controls a reception process in the receiver 101.

The transmitter 103 transmits traffic data and control data from the mobile station to the network apparatus.

The transmission controller 104 controls a transmission process in the transmitter 103.

During HSDPA communication, the radio quality measurement unit 105 measures indexes that indicate radio quality in corresponding cells based on pilot signals (CPICH) that have been received from the serving cell and the cells other than the serving cell. The index of the radio quality may be represented by any suitable quantity, such as $Ec/N_0$, RSCP, and the path loss, for example.

The SIR derivation unit 106 derives SIRs from the corresponding indexes of the radio quality which have been calculated by the radio quality measurement unit 105. When it is difficult to directly derive SIRs of individual cells that have been detected and measured by the mobile station besides the serving cell, the SIRs may be estimated from $Ec/N_0$s, which have been measured from CPICHs of the individual cells. During the estimation, a correspondence relationship between the $Ec/N_0$ and the SIR such as shown in FIG. 2 may be utilized. Such a correspondence relationship may be derived from a result of an actual measurement in a commercial network. The derived correspondence relationship between the $Ec/N_0$ and the SIR may be stored, for example, in a various table storing unit 107 as a table, and it may be read depending on necessity. The SIR derivation unit 106 converts the $Ec/N_0$s, which have been obtained for the individual cells, into the SIRs, based on the table. In the above explanation, "the indexes of the radio quality" are, for example, $Ec/N_0$, RSCP, or the path loss. The SIRs are derived from these. However, the definitions of such indexes are for the sake of convenience only. In the explanation below, "the radio quality" may be a measurement result of, for example, RSCP, $Ec/N_0$, and/or the pass loss; the SIR after despreading processing; or the CQI that is derived from the SIR. The radio quality is broadly defined to be a quantity that indicates whether the radio condition is good.

The various table storing unit 107 stores not only the table indicating the above-described correspondence relationship between the $Ec/N_0$ and the SIR, but also other tables or information such as shown in FIGS. 3 and 4. The tables or information stored in the various table storing unit 107, such as shown in FIGS. 2-4, may be stored in the mobile station in advance, may be stored as a result of a measurement by the mobile station, or may be updated constantly or upon completion of position registration in a specific area, in accordance with a notification from the network apparatus. A way of using these tables or the information will be described later.

The CQI determination unit 108 of FIG. 1 determines, for the serving cell and for the cells other than the serving cell, the corresponding CQIs by using the corresponding SIRs that have been derived by the SIR derivation unit 106.

The cell switching determination unit 109 performs two types of determination. One is to determine whether the radio quality of the serving cell (e.g., CQI and $Ec/N_0$) is worse than reference quality (e.g., CQI and $Ec/N_0$) that has been corresponded with a predetermined throughput. This is an absolute determination where a value which is not determined in advance (the radio quality of the serving cell) is compared with a predetermined value (the reference quality). The other one is to determine whether the serving cell is to be switched to a candidate switching target cell by comparing the radio quality of the serving cell with the radio quality of one or more candidate transfer target cells. This is a relative determination where values that are not determined in advance are compared with each other.

The data transmission rate measurement unit 110 measures a data transmission rate (throughput) of the communication in the serving cell, and stores the measurement result in the various table storing unit 107.

The threshold value determination unit 111 dynamically sets the reference quality by considering the data transmission rates which have been obtained in the past, so that the reference quality (e.g., the reference CQI) becomes a currently optimum value.

<2. Example of Operations>

Figure 5:
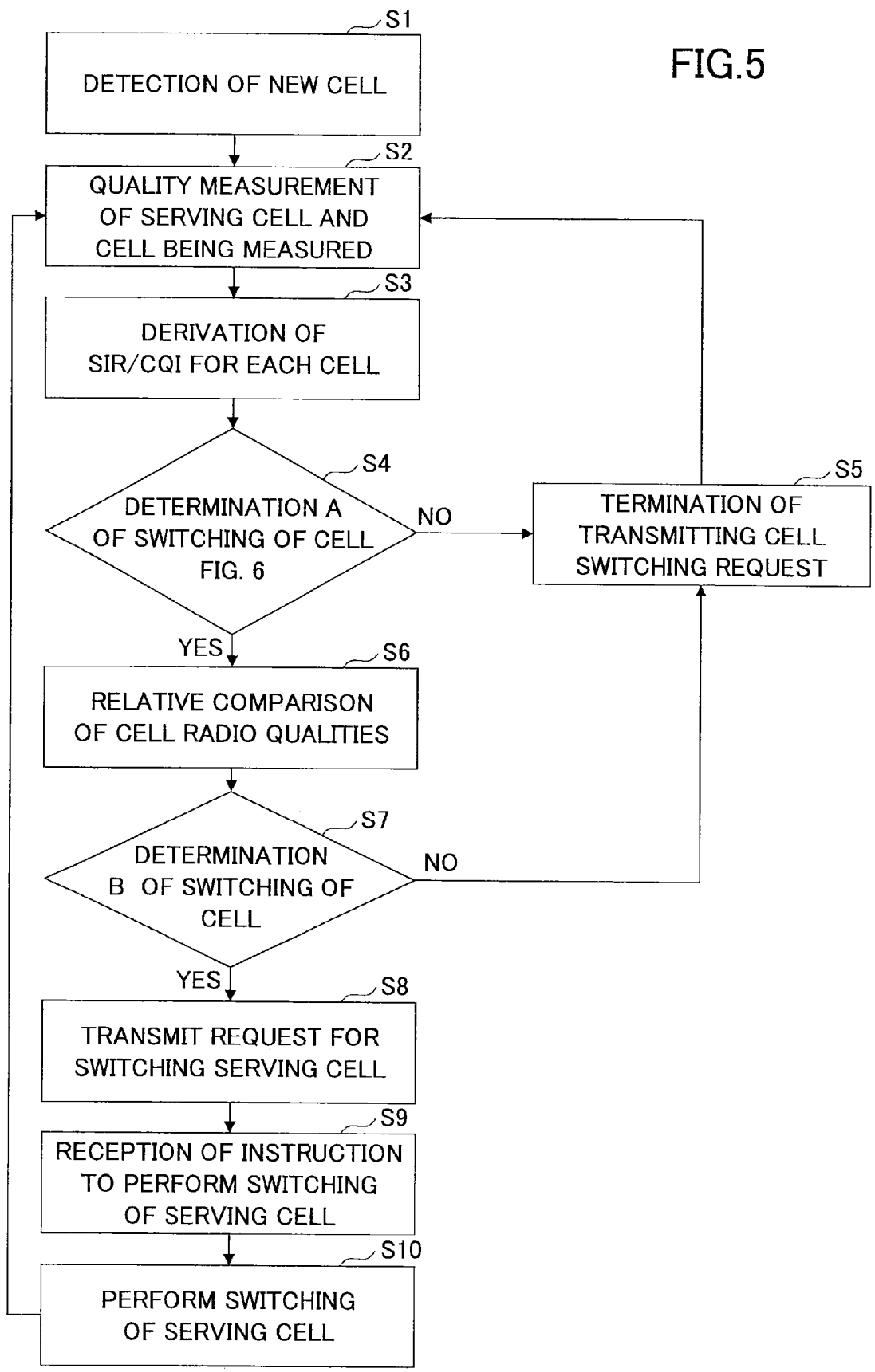
FIG. 5 is a flowchart illustrating an example of operations performed in the mobile station of FIG. 1.

FIG. 5 is a flowchart illustrating an example of operations performed in the mobile station of FIG. 1. For convenience of explanation, it is assumed that the mobile station is performing communication in a HSDPA mobile communication system. However, the disclosed invention may be applied to a mobile communication system other than the HSDPA mobile communication system. It is assumed that the mobile station receives a pilot signal (CPICH) from a serving cell and a cell other than the serving cell. The cell other than the serving cell is a neighboring cell or a peripheral cell that is neighboring to the serving cell.

At step S1, the mobile station detects existence of a new cell other than the serving cell.

At step S2, based on the CPICHs received from the serving cell and the cell other than the serving cell, the radio quality measurement unit 105 measures radio quality of the corresponding cells. The radio quality may be represented by $Ec/N_0$ or RSCP, for example. However, for the sake of the explanation, it is assumed that the radio quality measurement unit 105 of this step measures the $Ec/N_0$.

At step S3, the SIR derivation unit 106 obtains SIRs for the corresponding cells. In this case, if it is difficult to derive the SIRs for the individual cells other than the serving cell, the SIRs may be estimated by using the $Ec/N_0$s, which are measured from the CPICHs of the corresponding cells. During the estimation, a table such as shown in FIG. 2 may be utilized. Such a table may be stored in the various table storing unit 107. The table such as shown in FIG. 2 may be produced based on the $Ec/N_0$ and the SIR, which have actually been measured in a commercial network. The CQI determination unit 108 derives CQIs for the serving cell and the cell other than the serving cell by using the SIRs which have been derived by the SIR derivation unit 106.

At step S4, the cell switching determination unit 109 determines whether the radio quality (e.g., CQI or $Ec/N_0$) of the serving cell is worse than the predetermined reference quality (e.g., CQI or $Ec/N_0$), thereby determining whether it is necessary to switch the serving cell. This is an absolute determination where a value that has not been determined in advance (the radio quality of the serving cell) is compared with a value that has been determined in advance (the reference quality). The reference quality is a value that has been corresponded in advance with a throughput, which is desirable for the mobile station.

FIG. 3 shows an example of a correspondence relationship among the SIR measurement value, the CQI that may be the reference quality, and the downlink data rate (throughput) that is expected for the case of that CQI. For the case of this example, the reference quality is represented by the CQI. However, the reference quality may be represented by another value, such as $Ec/N_0$. A correspondence relationship between the CQI and the data transmission rate may be theoretically established, or it may be established based on actual measurements. For example, a relationship between the CQI values and corresponding MCS values is defined in a 3GPP specification. By calculating the expected downlink communication speeds based on such a relationship, the correspondence relationship such as shown in FIG. 3 may be derived, and it may be stored in the various table storing unit 107. The MCS values are parameters that specify predetermined combinations between data modulation schemes and transport block sizes (or channel coding rates). In general, a larger MCS value corresponds to a case where the throughput is larger, and a smaller MCS value corresponds to a case where the throughput is smaller.

Alternatively, in a commercial service environment where the corresponding CQI values can actually be obtained, by measuring how much average downlink data transmission is available, the correspondence relationship such as shown in FIG. 3 may be derived and stored in the various table storing unit 107.

In any case, the mobile station may determine the radio quality (the CQI, in this example) that may be required for achieving the intended data transmission rate based on the correspondence relationship such as shown in FIG. 3, and set it as the reference quality. As shown in FIG. 3, by obtaining the correspondence relationship between the CQIs and the expected downlink data transmission rates in advance, it becomes possible to determine what extent of the CQI value is required for achieving the intended data transmission rate. As a result, for example, when a cell is selected among multiple candidate switching target cells, by comparing the radio quality derived for each of the cells with the reference quality, it becomes possible to suitably select the cell, where, when communication based on the HSDPA is performed, the downlink data communication rate is expected to be high.

Figure 6:
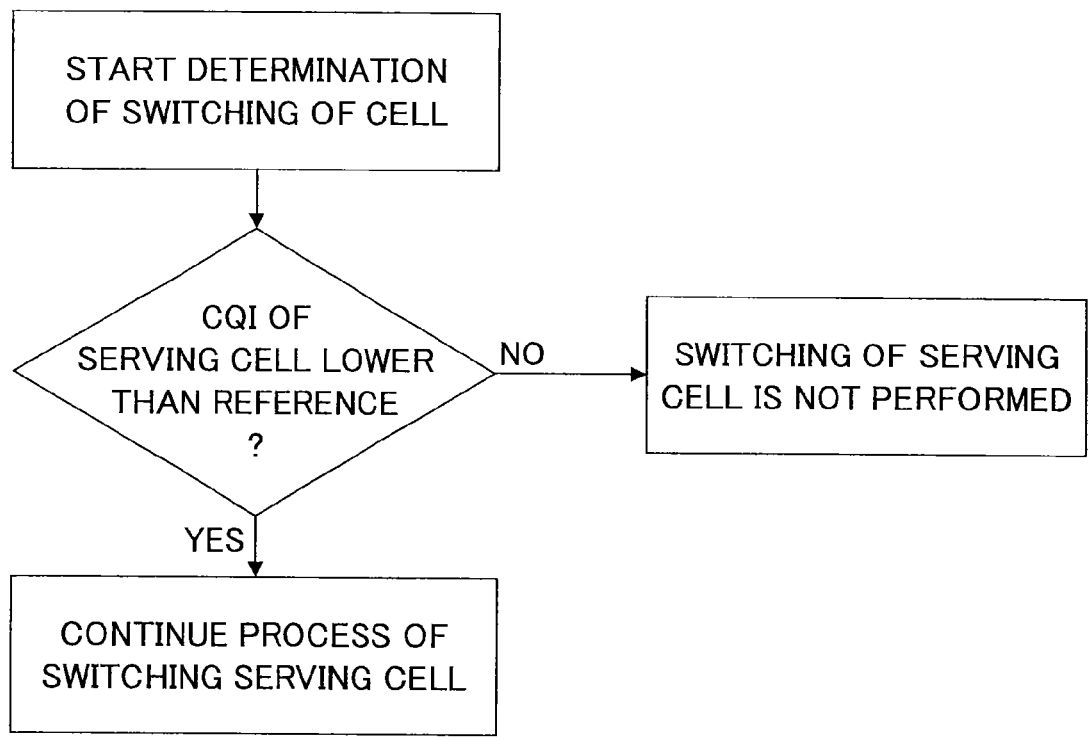
FIG. 6 is a flowchart illustrating details of step S4 in FIG. 5.

At step S4 of FIG. 5, the cell switching determination unit 109 determines whether the radio quality of the serving cell is worse than the reference quality, which has been determined as described above. Details of the process at step S4 are shown in FIG. 6.

Specifically, first, as a threshold value for obtaining the expected downlink data communication rate, the reference quality (in the current example, the reference CQI) is determined in advance. For example, it is assumed that the reference CQI is 20. In this case, as shown in FIG. 4, information that "the serving cell is switched when the CQI is less than 20, and the serving cell is not switched when the CQI is greater than or equal to 20" is stored in various table storing unit 107. When the CQI of the serving cell being in communication is greater than the reference CQI, the switching of the serving cell is not required. That is because, even if the communication is continued without switching, it is expected that the expected data communication rate is achieved. Therefore, in this case, it is determined that the serving cell is not to be switched, and the processing flow proceeds to step S5 of FIG. 5.

At step S5, the transmission controller 104 of the mobile station terminates a process of transmitting a signal for requesting to switch the serving cell (a measurement report), and subsequently the transmission controller 104 of the mobile station continues measuring the quality of the cell being in communication or being measured. With this, the switching of the serving cell that is not indispensable for continuing the communication may be suitably prohibited, and thereby redundant switching can be suppressed. Namely, decreasing of data transmission late due to unnecessary switching of the serving cell can be prevented, while ensuring a data communication rate that is greater than or equal to a certain rate.

On the other hand, when the radio quality (e.g., the CQI) of the serving cell is less than the reference quality (e.g., the reference CQI), it is possible that the intended data transmission rate is not achieved, provided that the communication is continued without switching the serving cell. In this case, the processing flow proceeds to step S6 of FIG. 5.

At step S6, the radio quality of the serving cell is compared with the radio quality of the corresponding cells other than the serving cell. Then, at step S7, it is determined whether the radio quality of the cell other than the serving cell is greater than or equal to the radio quality of the serving cell by the predetermined threshold value. To be more precise, it is determined whether such an inequality relationship is retained for a predetermined time period (e.g., the duration period corresponding to an event $1d$ of FIG. 4). As described above, the radio quality may be the CQI. Alternatively, the radio quality may be the RSCP, the $Ec/N_0$, or the path loss, for example.

For example, the $Ec/N_0$ of the serving cell is relatively compared with the $Ec/N_0$ of the cell other than the serving cell. When the $Ec/N_0$ of the cell other than the serving cell is not greater than or equal to the $Ec/N_0$ of the serving cell by the threshold value, the serving cell is not to be switched. In this case, the processing flow goes back to step S5 from step S7. The signal for requesting to switch the serving cell is not transmitted, and the measurement of the quality of the serving cell and the other cell is continued.

On the other hand, when the radio quality (e.g., $Ec/N_0$) of the serving cell is relatively compared with that of the other cell, and when the $Ec/N_0$ of the cell other than the serving cell is greater than or equal to the $Ec/N_0$ of the serving cell being in communication by the threshold value, it is determined to switch the serving cell. In this case, the processing flow proceeds from step S7 to step S8. The radio quality of the corresponding cells that is compared during the above described switching of the cell may be, for example, a measurement result of the RSCP, the $Ec/N_0$, and the path loss; the SIR after a despreading process; or the CQI that is derived from the SIR.

At step S8, under the control of the transmission controller 104, the transmitter 103 transmits a signal for requesting to switch the serving cell (the measurement report) to the network apparatus.

At step S9, the receiver 101 receives a signal for instructing to switch the serving cell (a handover command) from the network apparatus.

At step S10, the mobile station performs a hard hand over by synchronizing with the switching target cell or the target cell, thereby switching the serving cell to the switching target cell.

<3. Modified Example>

Figure 7:
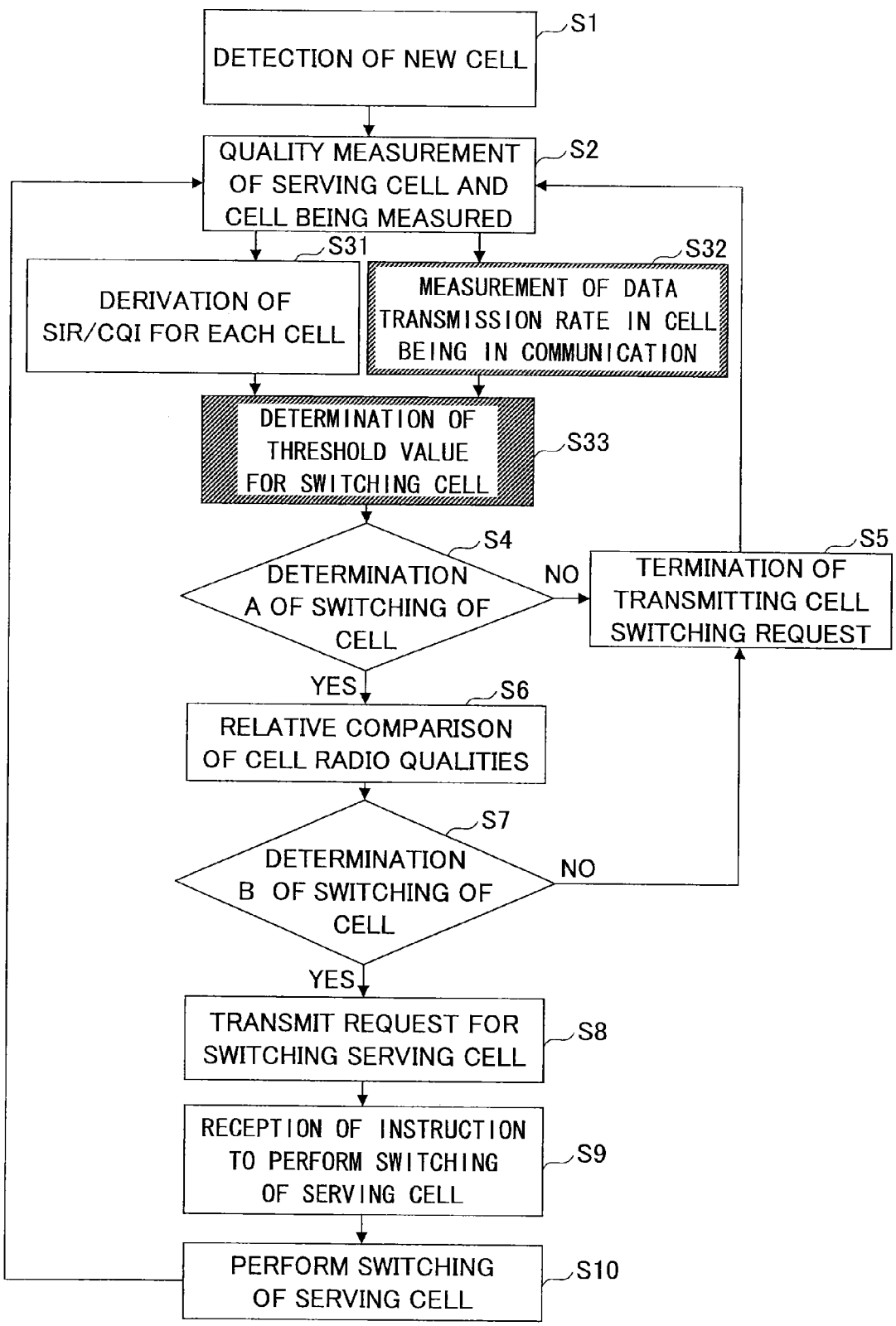
FIG. 7 is a flowchart illustrating a modified example of the above embodiment.

FIG. 7 is a flowchart showing a modified example of the above-described embodiment. It is substantially the same as the flow of FIG. 5, but it is different in the points that steps S32 and S33 are added. At step S31 of FIG. 7, the process that is similar to that of step S3 of FIG. 5 is performed.

At step S32 of FIG. 7, the data transmission rate measurement unit 110 of FIG. 1 measures the data transmission rate (throughput) of the serving cell being in communication, and stores the measurement result in the various table storing unit 107.

At step S33, the threshold value determination unit 111 determines the currently optimum reference quality (e.g., the reference CQI) based on the data transmission rates which have been obtained in the past, and reports the reference quality to the cell switching determination unit 109.

According to this modified example, by dynamically optimizing the reference quality, it is possible to more suitably determine whether the switching of the serving cell is required.

As described, according to the above-described embodiment (including the modified example), the radio quality (e.g., $Ec/N_0$, SIR, and CQI) is obtained not only for the serving cell, but also for the individual cells other than the serving cell. Then, by referring to the expected throughput that is corresponding to the radio quality and that is stored in advance in a database, it is possible to find a throughput that is expected for a case where the communication is supposed to be continued in the serving cell. For the determination of whether the switching of the serving cell is required, the determination can be made by considering not only the radio quality, but also the throughput (the data transmission rate). When a peripheral cell having good quality is detected but the throughput expected for the serving cell is greater than or equal to the threshold value, it is determined that the switching to the cell is not required, and the switching of the serving cell is not performed. When the throughput expected for the serving cell is less than the threshold value, determination is made as to whether the serving cell is to be switched. Subsequently, it is determined whether the switching of the serving cell is required. In this manner, by making the determination as to whether the switching of the serving cell is required in two steps, where not only the radio quality, but also the throughput is considered, the redundant switching of the cell, which may decrease the downlink data transmission rate, is suppressed, and consequently the downlink throughput can be improved.

In the above, the explanation has been provided while referring to specific embodiments, but the embodiments are merely illustrative, and variations, modifications, alterations and substitutions could be conceived by those skilled in the art. For example, the disclosed invention may be applied to any appropriate mobile communication system where a mobile station having a function to switch the serving cell is utilized. For example, the disclosed invention may be applied to a HSDPA/HSUPA based W-CDMA system, an LTE system, an LTE-Advanced system, an IMT-Advanced system, a WiMAX based system, a Wi-Fi based system and the like. Specific examples of numerical values have been used in order to facilitate understanding of the invention. However, these numerical values are simply illustrative, and any other appropriate values may be used, except as indicated otherwise. The separations of the embodiments or the items are not essential to the present invention, and subject matter described in two or more items may be combined and used (provided that they do not contradict) depending on necessity. For the convenience of explanation, the devices according to the embodiments of the present invention have been explained by using functional block diagrams. However, these devices may be implemented in hardware, software, or combinations thereof. The software may be prepared in a random access memory (RAM), a flash memory, a read-only memory (ROM), an EPROM, an EEPROM, a resister, a hard disk (HDD), a removable disk, a CD-ROM, a data base, and any other suitable recording medium. The present invention is not limited to the above-described embodiments, and various variations, modifications, alterations, substitutions and so on are included, without departing from the spirit of the present invention.

The present international application claims priority based on Japanese Patent Application No. 2010-85957, filed on Apr. 2, 2010, the entire contents of which are hereby incorporated by reference.

The invention claimed is:

1. A mobile station comprising:
circuitry configured to measure radio qualities for a serving cell and a candidate switching target cell;
set a reference quality in accordance with a correspondence relationship retained in the memory, the correspondence relationship table between one or more radio qualities and throughputs expected for the corresponding one or more radio qualities;
determine whether the radio quality of the serving cell is less than the reference quality, the reference quality having been corresponded with a predetermined throughput in advance;
when the radio quality of the serving cell is less than the reference quality, determine whether the serving cell is to be switched to the candidate switching target cell by comparing the radio quality of the serving cell with the radio quality of the candidate switching target cell;
transmit a first signal for requesting the switching of the serving cell; and
receive a second signal for instructing the switching of the serving cell from a network apparatus,
wherein, when the state in which the radio quality of the candidate switching target cell is greater than or equal to the radio quality of the serving cell by the predetermined value is retained for the predetermined time period, the circuitry is configured to determine that the serving cell is not to be switched to the candidate switching target cell, and
wherein, when the state in which the radio quality of the candidate switching target cell is greater than or equal to the radio quality of the serving cell by the predetermined value is not retained for the predetermined time period, the circuitry is configured to determine that the serving cell is not to be switched to the candidate switching target cell.

2. The mobile station according to claim 1, further comprising:
the memory configured to retain the correspondence relationship between the one or more radio qualities and the throughputs expected for the corresponding one or more radio qualities.

3. The mobile station according to claim 1,
wherein the circuitry is configured to determine whether the radio quality of the serving cell is less than the reference quality having been corresponded in advance with the predetermined throughput, and
wherein, when the radio quality of the serving cell is greater than or equal to the reference quality, the circuitry is configured to determine not to switch the serving cell to the candidate switching target cell.

4. The mobile station according to claim 1, wherein the circuitry is further configured to:
measure a throughput for the serving cell; and
set the reference quality in accordance with the measured throughput.

5. A method executed by a mobile station comprising:
measuring, by circuitry of the mobile station, radio qualities for a serving cell and a candidate switching target cell;
setting a reference quality in accordance with a correspondence relationship retained in the memory, the correspondence relationship table between one or more radio qualities and throughputs expected for the corresponding one or more radio qualities;
determining, by the circuitry, whether the radio quality of the serving cell is less than the reference quality, the reference quality having been corresponded with a predetermined throughput in advance;
when the radio quality of the serving cell is less than the reference quality, determining whether the serving cell is to be switched to the candidate switching target cell by comparing the radio quality of the serving cell with the radio quality of the candidate switching target cell;
transmitting a first signal for requesting the switching of the serving cell; and
receiving a second signal for instructing the switching of the serving cell from a network apparatus,
wherein, when a state in which the radio quality of the candidate switching target cell is greater than or equal to the radio quality of the serving cell by a predetermined value is retained for a predetermined time period, the step of determining whether the serving cell is to be switched includes determining that the serving cell is to be switched to the candidate switching target cell, and
wherein, when the state in which the radio quality of the candidate switching target cell is greater than or equal to the radio quality of the serving cell by the predetermined value is not retained for the predetermined time period, the step of determining whether the serving cell is to be switched includes determining that the serving cell is not to be switched to the candidate switching target cell.

* * * * *